United States Patent [19]
Kodama et al.

[11] Patent Number: 5,623,607
[45] Date of Patent: Apr. 22, 1997

[54] DATA TRANSFER CONTROL METHOD FOR CONTROLLING TRANSFER OF DATA THROUGH A BUFFER WITHOUT CAUSING THE BUFFER TO BECOME EMPTY OR OVERFLOW

[75] Inventors: Satoshi Kodama, Yokohama; Mikito Ogata, Minamiashigara; Shigeru Kaga, Odawara; Shinjiro Shiraki, Kanagawa-ken, all of Japan

[73] Assignees: Hitachi, Ltd., Tokyo; Hitachi Computer Engineering Co., Ltd.; Hitachi Computer Peripherals Co., Ltd., both of Kanagawa-ken, all of Japan

[21] Appl. No.: 314,782

[22] Filed: Sep. 29, 1994

[30] Foreign Application Priority Data

Oct. 5, 1993 [JP] Japan .................................. 5-249077

[51] Int. Cl.$^6$ ..................................................... G06F 13/00
[52] U.S. Cl. ........................................ 395/250; 395/200.13
[58] Field of Search ........................... 395/250, 200.13, 395/873

[56] References Cited

U.S. PATENT DOCUMENTS

| | | | |
|---|---|---|---|
| 4,040,027 | 8/1977 | van Es et al. | 395/250 |
| 4,258,418 | 3/1981 | Heath | 395/873 |
| 4,365,296 | 12/1982 | Ulmer . | |
| 4,672,613 | 6/1987 | Foxworthy et al. | 395/250 |
| 4,860,193 | 8/1989 | Bentley et al. | 395/250 |
| 4,860,244 | 8/1989 | Bruckert et al. | 395/250 |
| 4,901,277 | 2/1990 | Soloway et al. | 395/200.13 |
| 5,038,277 | 8/1991 | Altman et al. | 395/250 |
| 5,117,486 | 5/1992 | Clark et al. | 395/250 |
| 5,418,912 | 5/1995 | Christenson | 395/200.13 |

FOREIGN PATENT DOCUMENTS

| | | |
|---|---|---|
| 247317 | 2/1987 | European Pat. Off. . |
| 380856 | 8/1990 | European Pat. Off. . |
| WO-A-9215059 | 9/1992 | WIPO . |

*Primary Examiner*—Richard L. Ellis
*Attorney, Agent, or Firm*—Antonelli, Terry, Stout & Kraus, LLP

[57] ABSTRACT

A data transfer control system in a data transfer apparatus including a plurality of data processing units having different data transfer speeds and a temporary holding circuit provided between the data processing units for temporarily holding data transferred between the data processing units. The data transfer apparatus sends a transfer request for data corresponding to a data storage capacity of the temporary holding circuit of the data transfer apparatus to the data processing unit on the side of sending data and sends a transfer request for data corresponding to the data storage capacity of the temporary holding circuit after an elapse of a delivering time of data to an information processing unit on the data transferred side of the temporary holding circuit from the time of the data transfer request is sent until the requested data from the data processing unit on the data sending side reaches the temporary holding circuit of the data transfer apparatus.

10 Claims, 3 Drawing Sheets

DATA TRANSFER CONTROL METHOD FOR CONTROLLING TRANSFER OF DATA THROUGH A BUFFER WITHOUT CAUSING THE BUFFER TO BECOME EMPTY OR OVERFLOW

BACKGROUND OF THE INVENTION

The present invention relates to a data transfer control system for controlling a data request to a higher-rank CPU for transfer of write data from the higher-rank CPU by means of packet communication or the like to a lower-rank information recording sub-system connected to a higher-rank apparatus, such as the higher-rank CPU or the like.

A communication control unit, such as an optical communication control unit or the like, used in such a lower-rank information recording sub-system, includes a buffer for accommodating a difference in transfer speed between a higher-rank CPU and a lower-rank memory unit. The communication control unit requests the higher-rank CPU to send data according to the size or capacity of the buffer for control of writing. Once a request for data transfer to the buffer is sent, further data request is stopped and the communication control unit waits until the data for one request is delivered from the buffer to a lower-rank memory unit provided at a lower-rank position. When the data for one request has been delivered, the communication control unit transmits a data request to the higher-rank CPU again. The communication control unit controls the data transfer from the higher-rank CPU to the lower-rank memory unit by repetition of the above operation. A conventional data transfer control system described above is disclosed in JP-A-4-225452.

With such a conventional system, however, as the length of the communication cable for connecting the higher-rank CPU and the information recording sub-system is made longer, eventually the time from issuance of the data request to the higher-rank CPU to the data arrival time of the data in the information recording sub-system will exceed the time it takes for the buffer to deliver all of its data in the full state. In the request for transfer of data to the buffer, even if a next data request is sent out immediately after data requested by a previous request has reached the buffer, the delivering of the received data to the lower-rank memory unit from the buffer will be completed before the next data is received from the higher-rank CPU. Accordingly, an empty state of the buffer occurs, and the data transfer to the lower-rank memory unit is interrupted during the empty state of the buffer, so that the buffer is not used efficiently.

SUMMARY OF THE INVENTION

The reason why the buffer becomes empty is that the next data request to the higher-rank CPU is stopped until data has been received when a request for data transfer to the buffer is sent from the communication control unit to the higher-rank CPU. The reason why the data request is stopped is to prevent data from overflowing from the buffer (a pointer at an input side is prevented from passing a pointer at an output side). Accordingly, in order to prevent data from being interrupted in the buffer, while at the same time keeping the data from overflowing from the buffer, when a data request is sent to the higher-rank CPU from the communication control unit, data requests are first sent out in succession based on the buffer capacity and then are sent with an interval corresponding to a delivering time of data for one data request from the buffer to the lower-rank memory unit between the sending of one data request and the sending of the next data request, so that an interval of sending the data requests from the information recording sub-system to the higher-rank CPU is coordinated with the buffer capacity and the sweep-out time for one unit of data from the buffer.

According to the present invention, utilization of a transfer delay time set to the length of the cable for connecting the information recording sub-system and the higher-rank CPU can allow data to be written into the buffer periodically, and, since the buffer does not become empty, a transfer waiting time to the lower-rank memory unit can be eliminated to attain efficient data transfer.

DESCRIPTION OF THE PREFERRED EMBODIMENT

Figure 1:
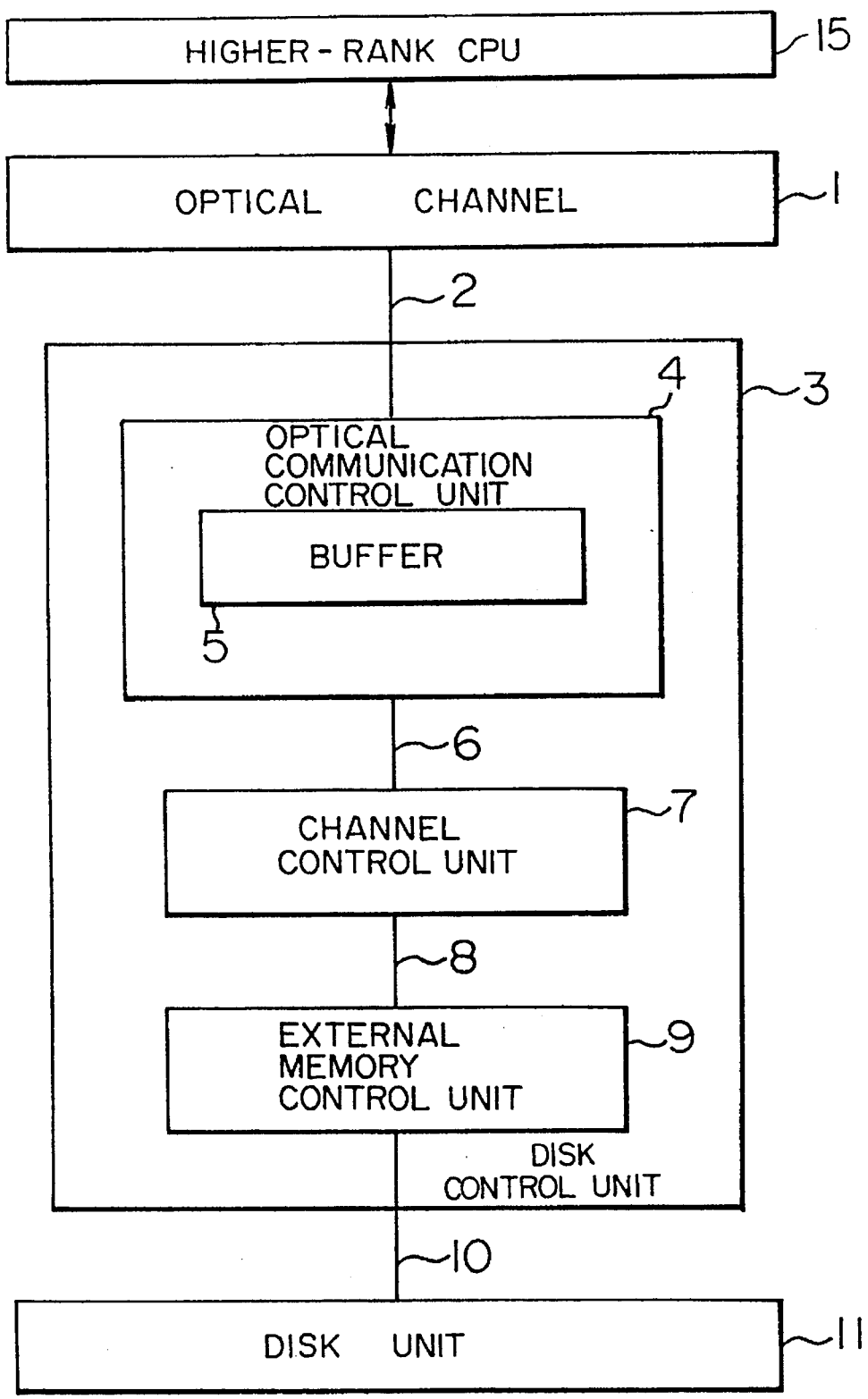
FIG. 1 is a schematic block diagram illustrating a disk sub-system including an optical communication control unit according to an embodiment of the present invention.

FIG. 1 is a schematic diagram illustrating a disk unit sub-system according to an embodiment of the present invention.

In FIG. 1, a disk control unit 3 includes an optical communication control unit 4 for controlling communication according to a predetermined protocol with a higher-rank optical channel 1, an external memory control unit 9 for controlling a lower-rank disk unit 11 and a channel control unit 7 communicating with the units 4 and 9. The control units are connected through an optical fiber cable 2, a path 6 between the optical communication control unit and the channel control unit, a path 8 between the channel control unit and the external memory control unit, and a path 10 between the external memory control unit and the disk unit. Further, the higher-rank optical channel 1 is connected to a higher-rank CPU 15.

The optical communication control unit 4 includes a buffer 5 which stores write data, received from the higher-rank CPU 15 through the optical channel 1, and read data, received from the disk unit 11, to thereby perform data transfer. The data stored in the buffer 5 is transferred to the channel control unit 7 or the higher-rank optical channel 1 under control of hardware in the optical communication control unit 4.

Figure 2:
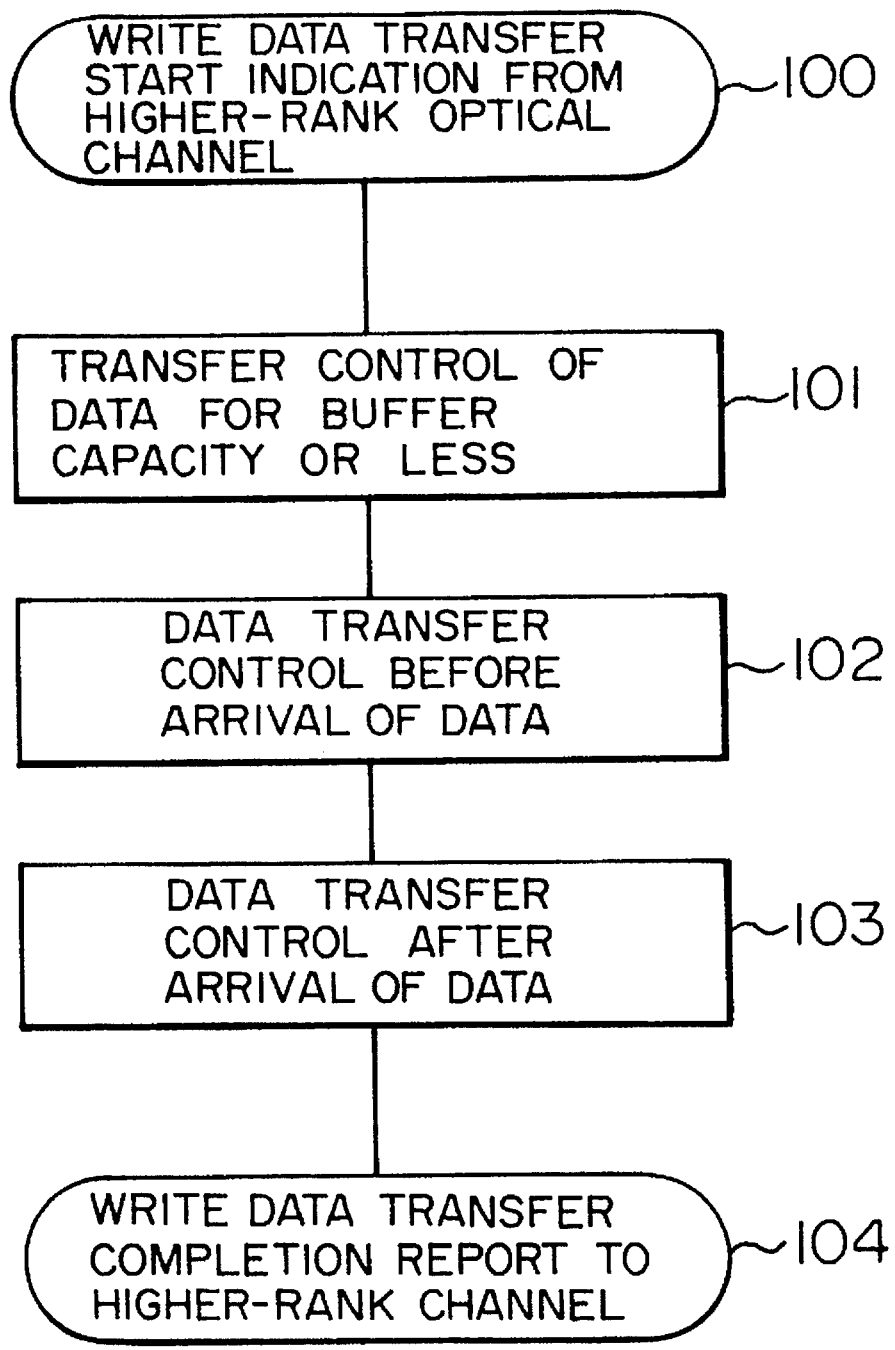
FIG. 2 is a flow chart showing microprogram control of the optical communication control unit according to the embodiment of the present invention.

FIG. 2 is a flow chart showing the write data transfer control of the optical communication control unit in the embodiment of the present invention.

Figure 3:
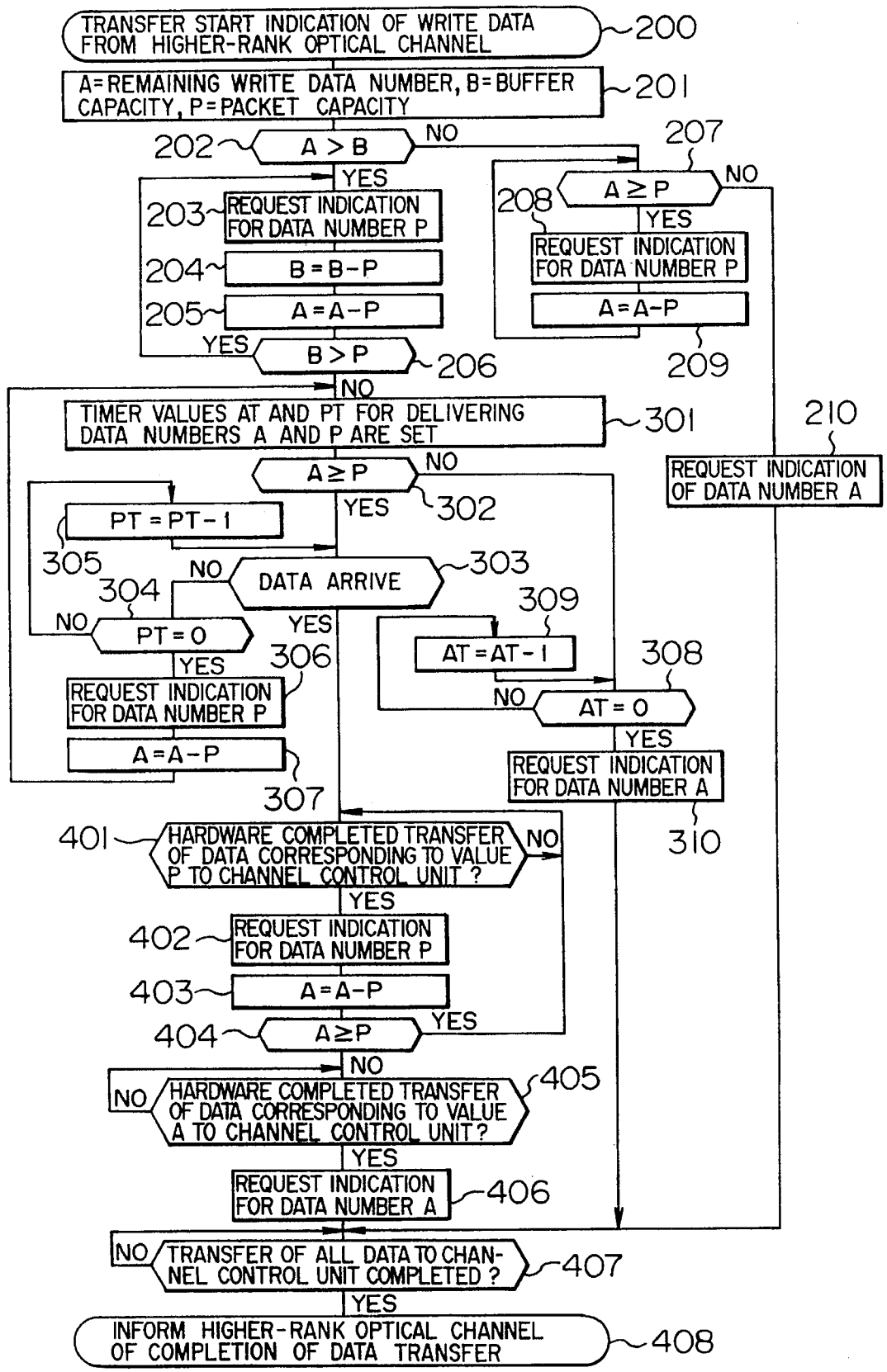
FIG. 3 is a detailed flow chart showing microprogram control of the optical communication unit 5 according to the embodiment of the present invention.

FIG. 3 is a more detailed flow chart of the write data transfer control of the optical communication control unit in the embodiment of the present invention.

Referring now to FIG. 1 and the flow chart of FIG. 2, the flow of control is described in brief. First of all, a write data transfer operation is started by a start indication sent to the disk control unit 3 from the higher-rank CPU 15 via optical channel 1 (step 100). The write data transfer control involves the data transfer control (step 101) for transfer of data in a quantity equal to the buffer capacity or less carried out at the beginning of the control, the data transfer control (step 102)

carried out before arrival of data, and the data transfer control (step 103) carried out after arrival of data. After execution of the data transfer control, the data transfer is finished (step 104).

In the transfer control (steps 101, 201 to 210) of data for the buffer capacity or less, a request for data having a capacity of the buffer 5 or less is indicated to the optical channel 1.

Once the request for data having a capacity of the buffer 5 or less is first indicated in step 101, the process does not stop and wait for the data as provided in the prior art, but proceeds to the data transfer control before arrival of data at the next step 102.

In the data transfer control (steps 102, 301 to 310) before arrival of data, the optical communication control unit 4 monitors a logical empty state of the buffer and sends a further data request to the optical channel 1. In the monitoring process of the logical empty state of the buffer, the data transfer from the buffer 5 to the channel control unit 7 by the physical hardware control is not performed before arrival of data and accordingly the empty state of the buffer 5 is monitored on the basis of an average data transfer speed of the hardware control for each transfer control request for data corresponding to the buffer capacity or less at step 101 to indicate the data request.

Thereafter, when the first data corresponding to the buffer capacity or less requested at step 101 is received, the process proceeds to the data transfer control after arrival of data at step 103.

In the data transfer control (steps 103, 401 to 408) after arrival of data, the optical communication control unit 4 monitors the physical (actual) empty state of the buffer and sends another data request to the optical channel 1. In the monitoring process of the physical empty state of the buffer, the data transfer from the buffer 5 to the channel control unit 7 by the hardware control is performed by the optical communication control unit 4 after arrival of the data and accordingly the empty state of the buffer 5 is monitored by the hardware control to send a data request for data left at steps 101 and 102.

Referring now to FIG. 1 and the flow chart of FIG. 3, the control flow of the write data transfer of the optical communication control unit 4 will be described in detail.

First of all, as an initial value of a remaining number A of write data, the number of all of the write data obtained from the start indication of the write data transfer received from the higher-rank CPU 15 is set. The buffer capacity B represents the number of data capable of being stored in the buffer 5. The packet capacity P represents the maximum number of data capable of being stored in a packet. A delivering timer value AT of the data number A represents a timer value (hour) of the time for delivering data corresponding to the data number A starting from a final data request indication to proceed from step 102 to 103 on the basis of the average data transfer speed from the buffer 5 to the channel control unit 7 by the hardware control. Finally, a delivering timer value PT of the data number P represents a timer value (hour) of the time for delivering data for the data number P from the buffer 5 starting from the final data request indication to proceed from step 102 to 103 on the basis of the average data transfer speed from the buffer 5 to the channel control unit 7 by the hardware control.

As shown at step 101 of FIG. 2, the transfer control of write data corresponding to the capacity or less of the buffer 5 is first described. The write data transfer is started from step 200 in response to the transfer start indication for transfer of the write data to the optical communication unit 4 from the higher-rank optical channel 1. At this time, values A, B and P are set as the overall amount of write data to be transferred, the buffer capacity, and the packet capacity, respectively (step 201).

Thus, when the remaining write data number A is larger than the buffer capacity B (A>B) (step 202), a request (step 203) for data in an amount corresponding to the value P to be stored in the buffer 5 in a unit of the packet capacity is sent to the higher-rank CPU 15 in order to initiate the transfer of data to the buffer from the higher-rank CPU 15. Then, in order to monitor the data request indication number, the value P is subtracted from the values B and A (B=B–P and A=A–P) (steps 204 and 205). In order to control the transfer of write data within the buffer capacity, steps 203–205 are repeated as long as the value B is larger than the value P (B>P) (step 206). When the value P becomes larger than the value B, the process proceeds to step 301.

Further, if the write data number A is not larger than the buffer capacity B (step 202), data requests (step 208) will be sent successively to the higher-rank CPU 15 in a unit of the packet capacity as long as the value A is larger than or equal to the value P (A≧P) (step 207), and in order to monitor the data request number, the value P is subtracted from 5 the value A (A=A–P) (step 209). Finally, when the value A is smaller than the value P (step 207), the request for data corresponding to the value A is sent to the higher-rank CPU 15 (step 210) and the process proceeds to step 407.

Control up until arrival of data requested through step 206, which is a point of the present invention, now will be described. The values AT and PT for controlling further data requests are first set to timers (step 301). Then, as long as the value A is larger than or equal to the value P (A≧P) (step 302), the logical buffer empty state is monitored in order to determine when a further request for data is to be sent. That is, while the arrival of data is monitored (step 303), the state of the buffer 5 with respect to the data requested up to step 206 is monitored on the basis of the average data transfer speed of the hardware control. More particularly, for the purpose of monitoring of a delivering time of the data corresponding to the value P, a timer value is subtracted from the value PT (step 305) and the data arrival is monitored (step 303) until the value PT is equal to zero (PT=O). When the delivering time of data corresponding to the value P elapses from the final data request indication at step 203 before arrival of data (PT=O) (step 304), a request for data corresponding to the value P is sent to the higher-rank CPU 15 (step 306) and the value P is subtracted from the value A (step 307). Thus, the monitoring of the data arrival and the delivering time of data corresponding to the value P is performed again (steps 303–305). When data at the head of the data requested at step 203 has arrived (step 303), the process proceeds to step 401. When the remaining write data number A of data to be sent from the higher-rank CPU 15 is smaller than the packet capacity before arrival of any data (step 302), the delivering time AT of data corresponding to the value A is monitored from the final data request indication at step 306 (step 308). A request for data number A is sent (step 310) to the higher-rank CPU 15 and the process proceeds to step 407.

Finally, the control performed after arrival of data will be described. Data which has reached or is stored in the buffer 5 is transferred to the channel control unit 7 by the hardware control. The data request procedure after arrival of data is switched from the method of sending a data request according to the delivering time for one packet before arrival of data to a method of monitoring the buffer 5 to determined when the transfer of data for one packet to the channel control unit is completed. At step 401, sending of data to the channel control unit 7 by the hardware control is monitored from the final data request indication at step 306 and when the hardware has completed transfer of data corresponding to the value P to the channel control unit 7, a request for data corresponding to the value P is sent to the higher-rank CPU 15 (step 402) and the value P is subtracted from the value A (step 403). As long as the value A is larger than or equal to the value P (A≧P), the process at steps 401–403 is repeated. When the value A is smaller than the value P, sending of data to the channel control unit 7 by the hardware control is monitored from the final data request indication and when the hardware has completed transfer of data corresponding to the value A to the channel control unit 7, a final request for data corresponding to the value A is sent to the higher-rank CPU (step 406) and the process proceeds to step 407.

Finally, sending of data to the channel control unit 7 by the hardware control is monitored (step 407) and when data for the whole write data number has been sent to the channel control unit 7, the write data transfer is finished (step 408). This method is performed in order to improve the reliability of data transfer.

In the configuration of the embodiment, even if the length of the cable is varied, a fixed transfer speed can be maintained by sending a request for a fixed amount of data at intervals of a fixed time.

We claim:

1. A data transfer control method for a data transfer apparatus which controls data transfer, through a buffer in said data transfer apparatus, between data processing apparatuses having different data transfer speeds, comprising:

a first transfer control step of transmitting data transfer requests from said data transfer apparatus to a first data processing apparatus, which supplies data, so as to transfer an initial quantity of data less than the data storing capacity of said buffer, in predetermined unit amounts, from said first data processing apparatus to said buffer in said data transfer apparatus;

a second transfer control step of transmitting further data transfer requests for a subsequent quantity of data from said data transfer apparatus to said first data processing apparatus to transfer a predetermined unit amount of data each time a sweep-out time has elapsed until data requested by the first transfer control step has arrived at the buffer, said sweep-out time being a time required for receiving and sweeping out a predetermined unit amount of data from said buffer to a second data processing apparatus, which receives data from said buffer, wherein transmitting said further data transfer request after said sweep-out time has elapsed prevents said buffer from ever reaching an empty an overflow condition; and a third transfer control step of transmitting at least one other data transfer request for transferring predetermined unit amounts of data to said first data processing apparatus, after the data requested by said first transfer control step has arrived at the buffer, and after a predetermined unit amount of data transferred to said buffer has been transmitted from the buffer to the second processing apparatus.

2. A data transfer control method according to claim 1, wherein said sweep out time is determined according to an average data transfer speed from said buffer to said second data processing apparatus.

3. A data transfer control method according to claim 1, wherein said first transfer control step further includes a step of receiving a data transfer start instruction from said first data processing apparatus and receiving information for indicating a total amount of data to be supplied from said first data processing apparatus.

4. A data transfer control method according to claim 3, wherein the sending of a data transfer request to said first data processing apparatus is repeated, until all of the data indicated by said information from said first data processing apparatus has been requested.

5. A data transfer control method according to claim 4, wherein data transfer from said buffer to said second data processing apparatus is monitored and when all of the data indicated by said information is transferred to the second data processing apparatus, a termination of data transfer is communicated to said first data processing apparatus.

6. A data transfer control method for a data transfer apparatus which controls data transfer, through a buffer in said data transfer apparatus, between a higher-rank data processing apparatus, which supplies data, and a lower-rank information recording sub-system, comprising:

a first transfer control step of transmitting at least one first data transfer request from said data transfer apparatus to said data processing apparatus, so as to initiate transfer, in predetermined unit amounts, of an initial quantity of data which is less than the data storing capacity of said buffer by less than a predetermined unit amount, from said data processing apparatus to said data transfer apparatus;

a second transfer control step of transmitting at least one second further data transfer request for a subsequent quantity of data from said data transfer apparatus to said data processing apparatus to transfer a predetermined unit amount of data each time a sweep-out time has elapsed until data requested by the first transfer control step hs arrived at the buffer, said sweep out time being the time required for receiving and sweeping out a predetermined unit amount of data from said buffer to the information recording sub-system, which receives data from said buffer, wherein transmitting said second data transfer request after said sweep-out time has elapsed prevents said buffer from ever reaching an empty or overflow condition; and a third transfer control step of transmitting at least one third data transfer request for transferring predetermined unit amounts of data to said data processing apparatus, after the data requested by said first transfer control step has arrived at the buffer, and after a predetermined unit amount of data transferred to said buffer has been transmitted from the buffer to the information recording sub-system.

7. A data transfer control method according to claim 6, wherein the sweep out time is determined according to an average data transfer speed from said buffer to said information recording sub-system.

8. A data transfer control method according to claim 6, wherein said first transfer control step further includes a step of receiving a data transfer start instruction from said data processing apparatus and receiving information for indicating a total amount of data to be supplied from said data processing apparatus.

9. A data transfer control method according to claim 8, wherein the sending of a data transfer request to said data processing apparatus is repeated, until all of the data indicated by said information from said data processing apparatus has been requested.

10. A data transfer control method according to claim 9, wherein data transfer from said buffer to said information recording sub-system is monitored and when all of the data indicated by said information is transferred to the information recording sub-system, a termination of data transfer is communicated to said data processing apparatus.

* * * * *